US011363507B2

(12) United States Patent
Okabe et al.

(10) Patent No.: US 11,363,507 B2
(45) Date of Patent: *Jun. 14, 2022

(54) MOBILE COMMUNICATION SYSTEM, SGW, TERMINAL COMMUNICATION METHOD AND CONTROL METHOD

(71) Applicant: NEC CORPORATION, Tokyo (JP)

(72) Inventors: Junya Okabe, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,738

(22) Filed: Feb. 13, 2018

(65) Prior Publication Data
US 2018/0176838 A1    Jun. 21, 2018

Related U.S. Application Data

(63) Continuation of application No. 14/419,699, filed as application No. PCT/JP2014/002456 on May 9, 2014, now Pat. No. 9,918,261.

(30) Foreign Application Priority Data

May 20, 2013   (JP) ................................ 2013-105981
Sep. 17, 2013   (JP) ................................ 2013-191772

(51) Int. Cl.
*H04W 36/02*       (2009.01)
*H04W 36/12*       (2009.01)
(Continued)

(52) U.S. Cl.
CPC ......... *H04W 36/023* (2013.01); *H04W 36/12* (2013.01); *H04W 68/005* (2013.01); *H04W 8/08* (2013.01)

(58) Field of Classification Search
CPC . H04W 36/023; H04W 68/005; H04W 36/12; H04W 8/08
See application file for complete search history.

(56) References Cited

U.S. PATENT DOCUMENTS

2009/0047954 A1*  2/2009  Tenny ................... H04W 48/20
                                                                         455/435.3
2009/0197589 A1   8/2009  Kitazoe
(Continued)

FOREIGN PATENT DOCUMENTS

CN        101150867 A       3/2008
EP        2 139 190 A1     12/2009
(Continued)

OTHER PUBLICATIONS

Decision to Grant a Patent, dated Jun. 19, 2018, and an English-language machine translation, issued by the Japanese Patent Office in counterpart Japanese Patent Application No. 2017-180978.
(Continued)

*Primary Examiner* — Pao Sinkantarakorn
*Assistant Examiner* — Kabir U Jahangir
(74) *Attorney, Agent, or Firm* — Sughrue Mion, PLLC

(57) ABSTRACT

A bearer management device that performs control to reliably receive an incoming packet call that is made while a mobile terminal device is moving is provided. A bearer management device (10) includes an incoming call control unit (11) that, in the case where a mobility management device (30) manages a location of a mobile terminal device (40) as a result of movement of the mobile terminal device (40) whose location has been managed by a mobility management device (20), suspends processing of an incoming call to the mobile terminal device (40) made during movement of the mobile terminal device (40) until receiving a notification about completion of movement of the mobile terminal device (40) from the mobility management device
(Continued)

(30), and resumes incoming call processing to the mobile terminal device (40) after receiving a notification about completion of movement of the mobile terminal device (40) from the mobility management device (30).

1 Claim, 10 Drawing Sheets

(51) Int. Cl.
*H04W 68/00* (2009.01)
*H04W 8/08* (2009.01)

(56) References Cited

U.S. PATENT DOCUMENTS

| | | | |
|---|---|---|---|
| 2010/0112982 | A1 | 5/2010 | Singh et al. |
| 2010/0220680 | A1* | 9/2010 | Ramankutty ......... H04W 68/08 370/329 |
| 2011/0090848 | A1 | 4/2011 | Kim et al. |
| 2012/0157132 | A1 | 6/2012 | Olsson et al. |
| 2012/0258704 | A1* | 10/2012 | Kim .................. H04W 52/0235 455/422.1 |
| 2012/0282956 | A1 | 11/2012 | Kim et al. |
| 2013/0189951 | A1* | 7/2013 | Lopez ............... H04W 36/0038 455/411 |
| 2013/0279420 | A1 | 10/2013 | Nishida et al. |
| 2013/0315059 | A1* | 11/2013 | Magatani ............. H04W 28/10 370/230 |
| 2014/0050199 | A1* | 2/2014 | Chen ................ H04W 36/0022 370/331 |
| 2014/0155109 | A1* | 6/2014 | Vaidya .................... H04W 8/06 455/458 |
| 2016/0073308 | A1 | 3/2016 | Okabe et al. |
| 2018/0176838 | A1 | 6/2018 | Okabe et al. |

FOREIGN PATENT DOCUMENTS

| | | |
|---|---|---|
| EP | 2 385 720 A1 | 11/2011 |
| EP | 2 472 992 A1 | 7/2012 |
| JP | 2005-348247 | 12/2005 |
| JP | 5606603 | 10/2014 |
| RU | 2 476 030 C2 | 3/2013 |
| RU | 2 477 933 C2 | 3/2013 |
| WO | WO 2011/026663 A2 | 3/2011 |
| WO | WO 2011/146880 A1 | 11/2011 |
| WO | WO 2012/093640 A1 | 7/2012 |
| WO | WO 2013/046532 A1 | 4/2013 |

OTHER PUBLICATIONS

Alcatel-Lucent, Downlink user data buffering in IDLE state, 3GPP TSG-SA WG2 Meeting #68, TD S2-086567, pp. 1-7, Oct. 2008.
Huawei, Periodic TA Update, 3GPP TSG-SA2 Meeting #64bis, S2-083361, May 2008.
Cisco, Rejecting the dedicated bearer related procedure from MME to SGW and PGW, 3GPP TSG CT4 Meeting #50, C4-102306, Aug. 2010.
Alcatel-Lucent, Discussion on the handling of dedicated bearer, 3GPP TSG SA WG2 Meeting #81, TD S2-104686, pp. 1-2, Oct. 2010.
ZTE, MT traffic in congestion when ISR is activated, 3GPP TSG-SA WG2 Meeting #89, TD S2-120654, pp. 1-4, Feb. 2012.
3GPP TS 23.401 V12.0.0, 3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 12), Mar. 2013.
International Search Report dated Jun. 10, 2014 in corresponding PCT International Application.
Decision on Grant dated May 25, 2015 by the Russian Patent Office in counterpart Russian Patent Application No. 2015107575.

Supplementary European Search Report issued by the European Patent Office in counterpart European Patent Application No. 14801871.6, dated Feb. 7, 2017.
Alcatel-Lucent et al., "Adding IMSI to DDN" 3GPP TSG CT4 Meeting #52 C4-110952, CR0892R3_29274_DDN_R1 0, 3rd Generation Partnership Project (3GPP), Mobile Competence Centre ; vol. CT WG4, No. Salt Lake City; Feb. 21, 2011, XP050484656, 10 pages, (2011).
Huawei et al: "Temporarily rejected due to mobility procedure in progress", 3GPP TSG CT4 Meeting #64; C4-140358, 29274_CR1433R1_(REL-12)_C4-140358, 3rd Generation Partnership Project (3GPP), Mobile Competence Centre ; vol. CT WG4, No. Guangzhou, China; Jan. 20, 2014-Jan. 24, 2014 3, XP050775116, 9 pages, (2014).
ZTE et al: "Missing Cause Value for MUPSAP", 3GPP TSG CT WG4 Meeting #55; C4-113113_WAS_3052_MUPSAP Cause R11, 3rd Generation Partnership Project (3GPP), Mobile Competence Centre; 650, Route Des Lucioles ; F-06921 Sophia-Antipolis Cedex; France, vol. CT WG4, No. San Francisco, US; Nov. 11, 2011-Nov. 18, 2011, 18, XP050559640, 11 pages, (2011).
NEC: "Add new rejection cause value to the DDN Acknowledge message", 3GPP TSG CT4 Meeting #64; C4-148821, 3rd Generation Partnership Project (3GPP), Mobile Competence Centre ; vol. CT WG4, No. Guangzhou; China 28148128-28148124, 7 pages, (2014).
Notification of Reasons for Refusal dated May 23, 2017, by the Japanese Patent Office in counterpart Japanese Patent Application No. 2014-249065.
3GPP TSG-CT WG4 Meeting #50, C4-102052, Cisco, "Discussion on UE mobility during MME failure", 3rd Generation Partnership Project, Xi'an, P.R. China, 4 pages, (2010).
3GPP TSG-CT WG4 Meeting #51 bis, C4-110106, ZTE, "Solutions for MME/S4-SGSN restart", 3rd Generation Partnership Project, Ljubljana, Slovenia, 8 pages, (2011).
Office Action dated Jul. 17, 2017, by the Columbia Patent Office in counterpart Japanese Patent Application No. 2014-002456.
3GPP TS29.274 v9.5.0 (Dec. 2010), 3rd Generation Partnership Project, Technical Specification Group Core Network and Terminals ;3GPP Evolved Packet System (EPS); Evolved General Packet Radio Service (GPRS) ; Tunnelling Protocol for Control Plane (GTPV2-C); Stage 3.
3GPP TS 23.401 V11.3.0, 3rd Generation Partnership Project; Technical Specification Group Services and System Aspects; General Packet Radio Service (GPRS) enhancements for Evolved Universal Terrestrial Radio Access Network (E-UTRAN), access (Release 11 ). Sep. 2012.
Notification of First Office Action dated Sep. 6, 2017, from the State Intellectual Property Office of the People's Republic of China in counterpart Chinese Patent Application 201480002475.2.
Alcatel-Lucent et al. "Adding IMSI to DDN", 3GPPTSG CT4 Meeting #52, C4-110935, 11 pages, Feb. 21-25, 2011.
Notice of Reasons for Refusal issued by the Japanese Patent Office in corresponding application No. JP 2018-135999, dated May 7, 2019.
Notice of Reasons for Refusal issued by the Japanese Patent Office in corresponding application No. JP 2019-210277, dated Aug. 25, 2020.
NTT Docomo; "New cause of DDN ack for MME restart and restoration procedure", 3GPP TSG CT4 Meeting #52, C4-110529, pp. 1-6 (2011).
Japanese Office Action for JP Application No. 2019-210277 dated Jan. 5, 2021 with English Translation.
NTT Docomo, NEC, "Router Advertisement handling for mobility procedure with S-GW change", 3GPP TSG-SA WG2#84 S2-111607 Apr. 6, 2011, Slovakia.
ALU?, Hitachi, Motorola Solutions, Handling of PCRF Initiated dedicated bearer related procedures during handover for PMIP, 3GPP TSG-SA WG2#84 S2-111781, Apr. 6, 2011.
Japanese Office Action for JP Application No. 2021-102812 dated May 10, 2022 with English Translation.
CATT, Paging flow for the ISSO, 3GPP TSG-SA WG2#59 S2-073154, 3GPP, Aug. 27-31, 2007.

(56) References Cited

OTHER PUBLICATIONS

CATT, China Mobile, UP Termination in Idle Mode, 3GPP TSG-SA WG2#56c S2-071352, 3GPP, Mar. 26-30, 2007.

* cited by examiner

MOBILE COMMUNICATION SYSTEM, SGW, TERMINAL COMMUNICATION METHOD AND CONTROL METHOD

CROSS-REFERENCE TO RELATED PATENT APPLICATIONS

This application is a continuation of U.S. patent application Ser. No. 14/419,699, filed Feb. 5, 2015, which is a National Stage Entry of International Application No. PCT/JP2014/002456, filed May 9, 2014, which claims the benefit of priority from Japanese Patent Application No. 2013-105981, filed May 20, 2013, and Japanese Patent Application No. 2013-191772, filed Sep. 17, 2013. The entire contents of the above-referenced applications are expressly incorporated herein by reference.

TECHNICAL FIELD

The present invention relates to a bearer management device and, for example, relates to a bearer management device that performs incoming call control for a mobile terminal device.

BACKGROUND ART

In the 3GPP (Third Generation Partnership Project) that defines a standard for mobile network systems, EPC (Evolved Packet Core) is specified as the next generation mobile network system. The EPC is a network system that accommodates an LTE (Long Term Evolution) access network in addition to wireless access networks called the second generation and the third generation.

Incoming packet call processing in the EPC is described hereinafter. In 3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.0.0 (2013-03), clauses 5.3.4.3, 5.3.3.2), incoming packet call processing in the case where a UE (User Equipment) representing a user terminal is in the idle mode is disclosed. The state where the UE is in the idle mode is the state where the UE is not connected with the EPC. In other words, a wireless bearer between the UE and the EPC is disconnected in this state. In such a case, when an incoming packet call is made to the UE, S-GW (Serving Gateway), which is a bearer management device, sends an incoming call notification message to MME (Mobility Management Entity) or SGSN (Serving GPRS Support Node) that manages the UE. Receiving the incoming call notification message, the MME or SGSN sends a Paging message to eNB (evolved Node B) or NodeB, which is a base station, in order to call the UE. Receiving the Paging message, the eNB or NodeB sends a Paging message to a plurality of UE located in the area managed by itself. The UE to be called sends a response message to the eNB or NodeB and connects to the EPC.

In this manner, even when an incoming packet call is made to the UE in the idle mode which is not connected with the EPC, it is possible to perform data communication with the UE by calling the UE from the network side.

CITATION LIST

Patent Literature

[NPL 1]
3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.0.0 (2013-03), clauses 5.3.4.3, 5.3.3.2

SUMMARY OF INVENTION

Technical Problem

However, in the incoming packet call processing disclosed in the above literature, the following problem occurs. Normally, when the UE moves out of a location registration area managed by the MME, the UE sends a location registration request (Tracking Area Update Request) message to a new MME that manages a location registration area to which the UE is to move. Receiving the location registration request message, the new MME performs location registration of the UE. After the location registration in the new MME is done, the UE becomes the state where it is registered in the new MME that manages the location registration area to which it is to move.

When an incoming packet call arrives to the UE after the UE sends the location registration request message and before processing for movement is done in the new MME, the S-GW sends the incoming call notification message to the old MME that has managed the location of the UE before movement. Receiving the incoming call notification message, the old MME sends a Paging message to a base station under its control; however, because the UE to be called has moved out to the area managed by the new MME, it is not possible to call the UE. In other words, when an incoming packet call is made while the UE is during its movement which involves a change in the MME, the problem that the UE cannot receive the incoming packet occurs.

An exemplary object of the present invention is to provide a bearer management device, a mobility management device, a mobile terminal device, a communication system, an incoming call processing method, a mobility management method and program that perform control so as to reliably receive an incoming packet call that is made during movement of the mobile terminal device.

Solution to Problem

A bearer management device according to a first exemplary aspect of the invention includes an incoming call control unit that, in a case where a second mobility management device manages a location of a mobile terminal device as a result of movement of the mobile terminal device whose location has been managed by a first mobility management device, suspends processing of an incoming call to the mobile terminal device made during movement of the mobile terminal device until receiving a notification about completion of movement of the mobile terminal device from the second mobility management device, and resumes incoming call processing to the mobile terminal device after receiving a notification about completion of movement of the mobile terminal device from the second mobility management device.

A mobility management device according to a second exemplary aspect of the invention is a mobility management device that manages movement of a mobile terminal device, including a communication unit that, when receiving an incoming call notification message to the mobile terminal device sent from a bearer management device in a case where the mobile terminal device whose location has been managed by the mobility management device has moved and a location of the mobile terminal device is managed by another mobility management device, sends a movement notification message indicating that the mobile terminal device has moved to said another mobility management device to the bearer management device.

A mobile terminal device according to a third exemplary aspect of the invention includes a communication unit that, when the mobile terminal device moves out of an area managed by a first mobility management device from a state where its location has been managed by the first mobility management device, sends a location registration request message to a second mobility management device and, when an incoming call is made before location registration of the mobile terminal device is completed in the second mobility management device, receives data addressed to the mobile terminal device using a wireless resource used when sending the location registration request message.

A communication system according to a fourth exemplary aspect of the invention includes a first mobility management device that manages a location of a mobile terminal device located in a first area, a second mobility management device that manages a location of a mobile terminal device located in a second area different from the first area, and a bearer management device that sends an incoming call notification message to the first or second mobility management device when an incoming call to the mobile terminal device is made, wherein, in a case where the second mobility management device manages a location of the mobile terminal device as a result of movement of the mobile terminal device having been located in the first area to the second area, the bearer management device suspends processing of an incoming call to the mobile terminal device made during movement of the mobile terminal device until receiving a notification about completion of movement of the mobile terminal device from the second mobility management device, and resumes incoming call processing to the mobile terminal device after receiving a notification about completion of movement of the mobile terminal device from the second mobility management device.

An incoming call processing method according to a fifth exemplary aspect of the invention includes, in a case where a second mobility management device manages a location of a mobile terminal device as a result of movement of the mobile terminal device whose location has been managed by a first mobility management device, suspending processing of an incoming call to the mobile terminal device made during movement of the mobile terminal device until receiving a notification about completion of movement of the mobile terminal device from the second mobility management device, and resuming incoming call processing to the mobile terminal device after receiving a notification about completion of movement of the mobile terminal device from the second mobility management device.

A mobility management method according to a sixth exemplary aspect of the invention is a mobility management method in a mobility management device that manages movement of a mobile terminal device, including, when receiving an incoming call notification message to the mobile terminal device from a bearer management device in a case where the mobile terminal device whose location has been managed by the mobility management device has moved and a location of the mobile terminal device is managed by another mobility management device, sending a movement notification message indicating that the mobile terminal device has moved to said another mobility management device to the bearer management device.

A program according to a seventh exemplary aspect of the invention causes a computer to execute, in a case where a second mobility management device manages a location of a mobile terminal device as a result of movement of the mobile terminal device whose location has been managed by a first mobility management device, a step of suspending processing of an incoming call to the mobile terminal device made during movement of the mobile terminal device until receiving a notification about completion of movement of the mobile terminal device from the second mobility management device, and a step of resuming incoming call processing to the mobile terminal device after receiving a notification about completion of movement of the mobile terminal device from the second mobility management device.

Advantageous Effects of Invention

According to the exemplary aspects of the present invention, it is possible to provide a bearer management device, a mobility management device, a mobile terminal device, a communication system, an incoming call processing method, a mobility management method and program that perform control to reliably receive an incoming packet call that is made during movement of the mobile terminal device.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

First Exemplary Embodiment

Figure 1:
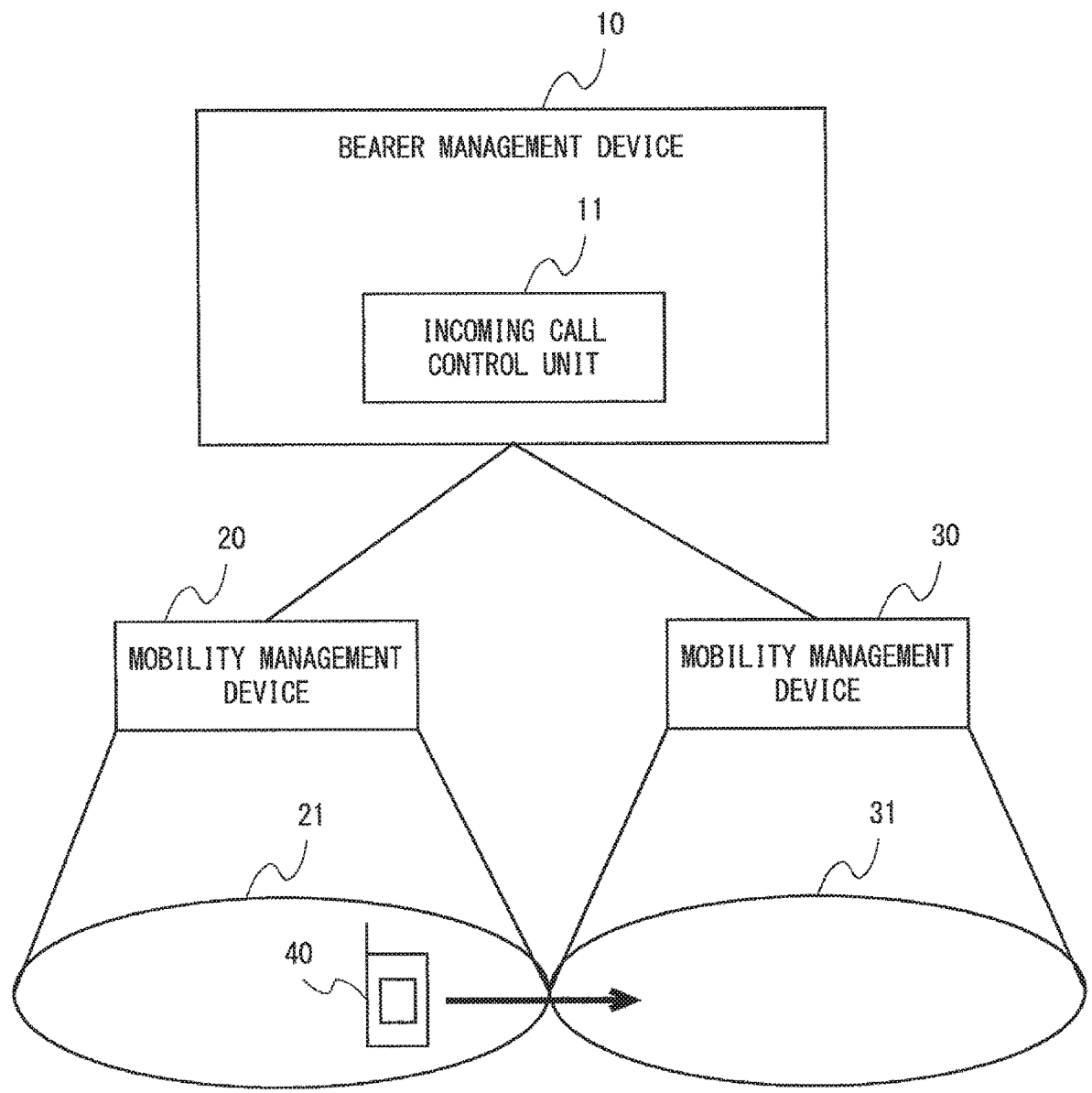
FIG. 1 is a configuration diagram of a communication system according to a first exemplary embodiment.

An exemplary embodiment of the present invention is described hereinafter with reference to the drawings. A configuration example of a communication system according to a first exemplary embodiment is described hereinafter with reference to FIG. 1. The communication system in FIG. 1 includes a bearer management device 10, a mobility management device 20, a mobility management device 30, and a mobile terminal device 40. The mobility management device 20 manages the location of the mobile terminal device located in a location registration area 21. The mobility management device 30 manages the location of the mobile terminal device located in a location registration area 31. Further, in FIG. 1, the mobile terminal device 40 is moving from the location registration area 21 to the location registration area 31. Note that, in FIG. 1, a wireless base station that wirelessly communicates with the mobile terminal device 40 is not shown. As the mobile terminal device 40 moves from the location registration area 21 to the location registration area 31, the mobility management device that manages the mobile terminal device 40 changes from the mobility management device 20 to the mobility management device 30. When registration of the mobile terminal device 40 is completed, the mobility management device 30 notifies the bearer management device 10 about the completion of movement of the mobile terminal device 40.

A configuration example of the bearer management device 10 is described hereinafter. The bearer management device 10 includes an incoming call control unit 11. The case where an incoming packet call is made to the mobile terminal device 40 when the mobile terminal device 40 has moved from the location registration area 21 to the location registration area 31 and before registration of the mobile terminal device 40 is completed in the mobility management device 30 is described hereinafter. In this case, even when an incoming call is made to the mobile terminal device 40, the incoming call control unit 11 suspends incoming call processing for the mobile terminal device 40 until it receives a notification about the completion of movement of the mobile terminal device 40 from the mobility management device 30. After receiving a notification about the completion of movement of the mobile terminal device 40 from the mobility management device 30, the incoming call control unit 11 resumes incoming call processing for the mobile terminal device 40. For example, the incoming call control unit 11 may acquire information that the mobile terminal device 40 is during its movement from the mobility management device 20 when performing incoming call processing for the mobility management device 20.

The incoming call processing is processing that notifies an incoming call message to the mobility management device that manages the mobile terminal device 40, and sends data addressed to the mobile terminal device 40 to the mobile terminal device 40, for example. Suspending the incoming call processing may means that, when the incoming call control unit 11 detects that the mobile terminal device 40 is moving, it suspends transition to processing of sending data (user data) addressed to the mobile terminal device 40 to the mobile terminal device 40 and, after receiving a notification about the completion of movement of the mobile terminal device 40, sends the data addressed to the mobile terminal device 40 to the mobile terminal device 40. Alternatively, it may mean that the incoming call control unit 11 suspends transmission of an incoming call message to the mobility management device until it receives a notification about the completion of movement of the mobile terminal device 40 from the mobility management device 30. During movement of the mobile terminal device 40 may be a period from when the mobile terminal device 40 sends a location registration request message to the mobility management device 30 that manages the location registration area 31 to which it is to move to when the mobility management device 30 notifies a message indicating the completion of movement of the mobile terminal device 40 to the bearer management device 10.

Suspending the incoming call processing may be temporarily suspending the incoming call processing, temporarily stopping the incoming call processing, ceasing the incoming call processing with the assumption of resuming the incoming call processing, deferring the execution of the incoming call processing and the like.

As described above, with use of the communication system in FIG. 1, even when an incoming packet call is made to the mobile terminal device 40 while the mobile terminal device 40 is during its movement which involves a change in the mobility management device that manages its location, the mobile terminal device 40 can receive the packet communication. In other words, the bearer management device 10 can resume the incoming call processing for the mobile terminal device 40 after receiving a notification about the completion of movement from the mobility management device 30 that manages the location registration area to which the mobile terminal device 40 moves. Therefore, even when an incoming packet call is made before processing for movement of the mobile terminal device 40 is not done, the bearer management device 10 can notify the mobile terminal device 40 about an incoming packet call.

Second Exemplary Embodiment

Figure 2:
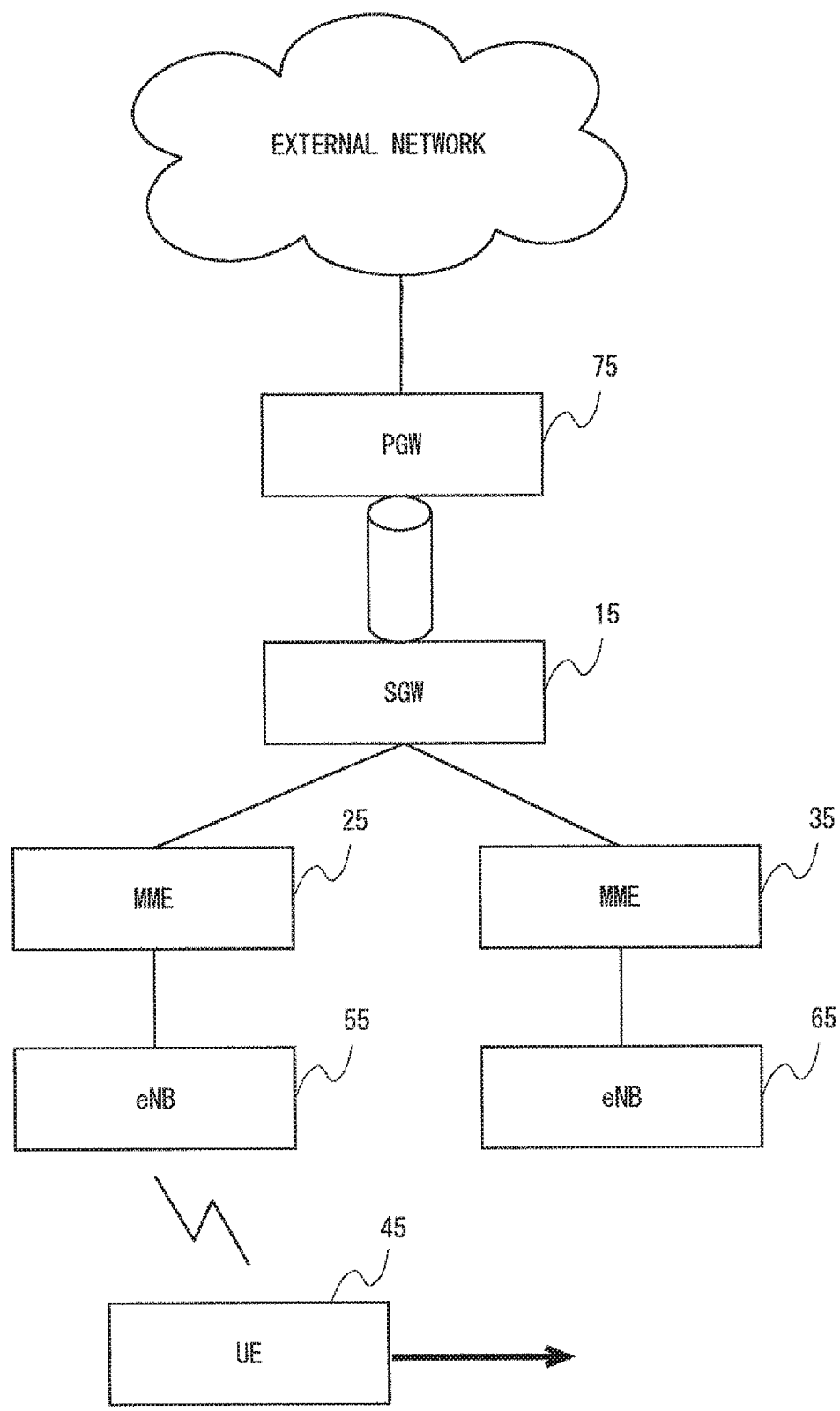
FIG. 2 is a configuration diagram of a mobile communication system specified in the 3GPP according to a second exemplary embodiment.

A configuration example of a communication system according to a second exemplary embodiment of the invention is described hereinafter with reference to FIG. 2. In FIG. 2, a mobile communication system specified in the 3GPP is described as a communication system. The communication system in FIG. 2 includes PGW (Packet Data Network GateWay) 75, SGW (Serving GateWay) 15, MME 25, MME 35, UE 45, eNB 55 and eNB 65.

The UE 45 is a communication device that is specified as a mobile terminal device in the 3GPP. The UE 45 may be a cellular phone, a smartphone, a tablet terminal, a personal computer with a communication function or the like, for example. Further, the UE 45 may be an M2M (Machine To Machine) device that performs communications in an autonomous manner. The M2M device may be a device that does not often move such as an automatic vending machine or an electrical appliance having a communication function, or a watch worn by a user and the like, for example.

The eNB55 and eNB 65 are node devices specified as base stations in the 3GPP. Each of the eNB 55 and eNB 65 forms a wireless communication area and communicates with the UE that is located in the wireless communication area managed by itself.

The PGW 75 is a node device that is located at the boundary between the mobile communication system and the external network. The PGW 75 sends data sent from the external network to the node device in the mobile communication system. The PGW 75 establishes a communication bearer with the SGW 15. The communication bearer may be referred to as a communication channel, a communication path or the like, for example. The PGW 75 sends data sent from the external network to the SGW 15 through the communication bearer.

The bearer management device 10 in FIG. 1 is specified as the SGW 15 in the 3GPP. When the SGW 15 receives a notification about an incoming packet call to the UE 45, it notifies an incoming call message to the MME 25 or MME 35. Further, the SGW 15 sends data addressed to the UE 45 to the eNB 55 or eNB 65 that communicates with the mobile terminal device 45.

The mobility management devices 20 and 30 in FIG. 1 are specified as the MME 25 and MME 35 in the 3GPP. Each of the MME 25 and MME 35 defines a location registration area that manages the location of the UE. In the location registration area managed by each of the MME 25 and MME 35, a plurality of eNB may be located. In other words, the location registration area may include a plurality of wireless communication areas formed by eNB.

When the UE 45 moves from the location registration area defined by the MME 25 to the location registration area defined by the MME 35, the UE 45 sends a location registration request message to the MME 35. Receiving the location registration request message sent from the UE 45, the MME 35 performs processing for movement of the UE 45. The processing for movement of the UE 45 is processing that the MME 35 registers the UE 45 as a device to be managed, for example. Further, when the MME 35 receives the location registration request message sent from the UE 45, it sends a message notifying that the UE 45 has moved to the location registration area defined by the MME 35 to the MME 25 that manages the location registration area from which the UE 45 moves. The UE 45 may add an identifier of the MME 25 that manages the location registration area before movement to the location registration request message for the MME 35. The MME 35 can thereby detect the MME 25 that manages the location registration area from which the UE 45 moves. The MME 25 receives the notification message from the MME 35 and can thereby detect that the UE 45 has moved to the location registration area defined by the MME 35.

After the processing for movement of the UE 45 is completed, the MME 35 sends a message indicating the completion of movement processing of the UE 45 to the SGW 15. In the case where an incoming packet call is made to the UE45, the SGW 15 sends an incoming call notification message to the MME 25 until a message indicating the completion of movement processing of the UE 45 is sent from the MME 35.

There is a case where the MME 25 receives an incoming call notification message to the UE45 from the SGW 15 after it receives a message indicating the movement of the UE 45 from the MME 35. In such a case, the MME 25 sends a message notifying that the UE 45 has moved out to the SGW 15.

By receiving the message notifying that the UE 45 has moved out from the MME 25, the SGW 15 detects that the UE 45 is during its movement which involves a change in the MME. When the SGW 15 detects that the UE 45 is during its movement which involves a change in the MME, the SGW 15 temporarily stores data addressed to the UE 45 into a buffer. When the SGW 15 receives a message notifying the completion of movement of the UE 45 from the MME 35, the SGW 15 sends an incoming call notification message to the UE 45 to the MME 35. After that, the SGW 15 sends the data addressed to the UE 45 to the UE 45.

Figure 3:
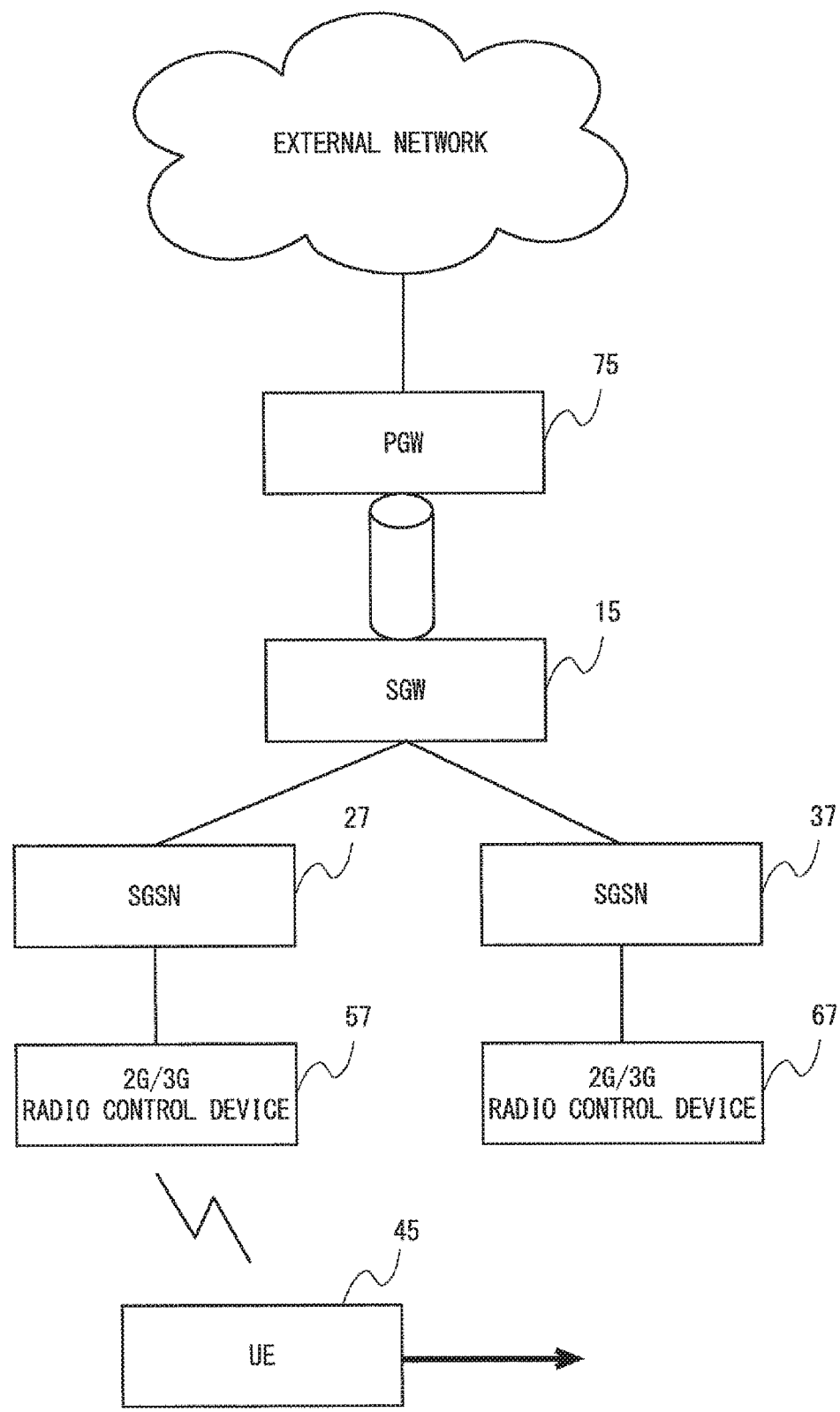
FIG. 3 is a configuration diagram of a mobile communication system specified in the 3GPP according to the second exemplary embodiment.

Although the mobility management devices 20 and 30 are described as being the MME 25 and 35 above, the mobility management devices 20 and 30 may be SGSN 27 and 37 as shown in FIG. 3, The SGSN 27 and 37 are node devices that manage the location of the UE that communicates with a wireless access network called 2G or 3G. The SGSN 27 and 37 connect to 2G/3G wireless control devices 57 and 67 in the wireless access network called 2G or 3G in the 3GPP. The 2G/3G wireless control device in the wireless access network called 2G or 3G may be called RNC (Radio Network Controller), for example. The configuration shown in FIG. 3 is the same as that of FIG. 2 except that the MME 25 and 35 are replaced with the SGSN 27 and 37, and the eNB 55 and 65 are replaced with the 2G/3G wireless control devices 57 and 67.

Figure 4:
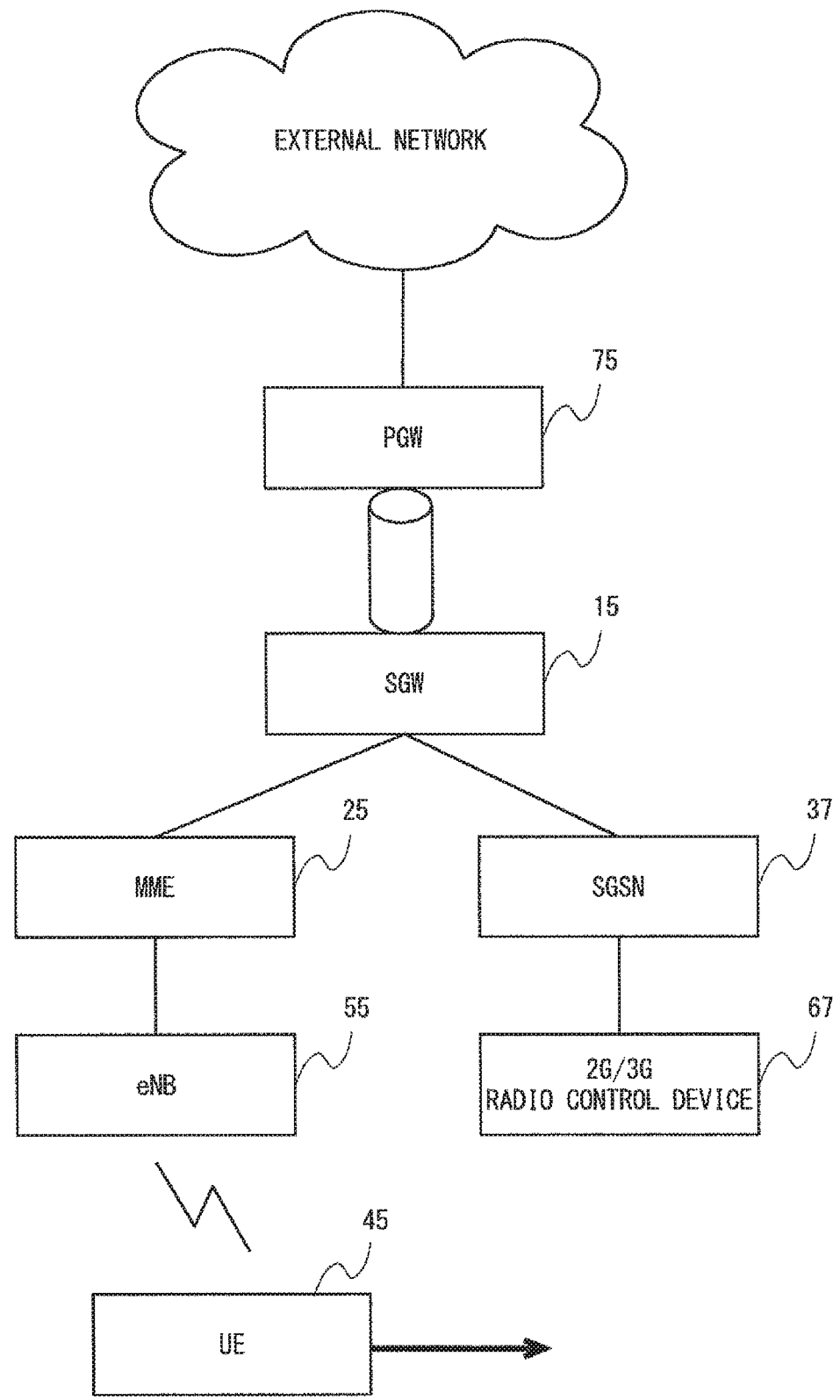
FIG. 4 is a configuration diagram of a mobile communication system specified in the 3GPP according to the second exemplary embodiment.

Further, the SGW 15 may connect to the MME 25 and the SGSN 37 as shown in FIG. 4. In other words, the SGW 15 may be located in the system where the MME and the SGSN coexist. The configuration shown in FIG. 4 is the same as that of FIG. 2 except that the MME 35 in FIG. 2 is replaced with the SGSN 37, and the eNB 65 is replaced with the 2G/3G wireless control device 67.

Figure 5:
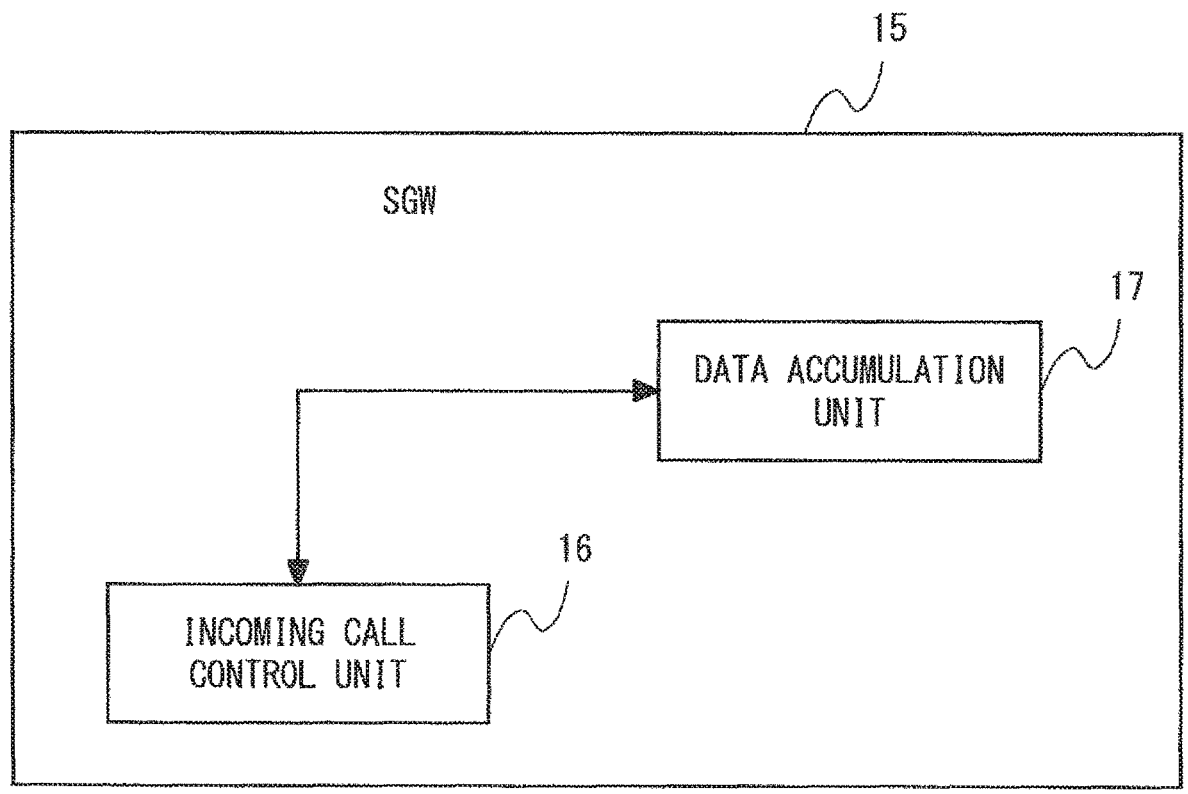
FIG. 5 is configuration diagram of SGW according to the second exemplary embodiment.

A configuration example of the SGW 15 according to the second exemplary embodiment of the invention is described hereinafter with reference to FIG. 5. The SGW 15 includes an incoming call control unit 16 and a data accumulation unit 17. The incoming call control unit 16 is the same as the incoming call control unit 11 in FIG. 1.

When a message notifying the movement of the UE 45 is sent from the MME 25 that manages the location registration area from which the UE 45 moves, the incoming call control unit 16 temporarily stores data addressed to the UE 45 into the data accumulation unit 17. Further, when a message notifying the completion of movement of the UE 45 is sent from the MME 35 that manages the location registration area to which the UE 45 moves, the incoming call control unit 16 sends an incoming call message to the UE 45 to the MME 35. Further, when a wireless bearer is established between the UE 45 and the eNB 65, the incoming call control unit 16 sends the data stored in the data accumulation unit 17 to the UE 45 through the eNB 65.

Hereinafter, a flow of processing to connect the UE to the mobile communication system according to the second exemplary embodiment of the invention is described with reference to FIG. 6. First, when a power switch is pressed by a user and a power is turned on, the UE 45 sends an Attach Request message as the location registration request message to the eNB 55 (S11). Next, the eNB 55 sends the Attach Request message sent from the UE 45 to the MME 25 (S12). Receiving the Attach Request message, the MME 25 generates location registration information of the UE 45. The location registration information contains information indicating that the UE 45 is located within the location registration area managed by its own device or subscriber information of the UE 45, for example. The subscriber information of the UE 45 may be acquired from a subscriber information management device (not shown) that is placed in the mobile communication system. The subscriber information management device is specified as HSS (Home Subscriber Server) in the 3GPP, for example. Then, the MME 25 notifies the subscriber information of the UE 45 to the SGW 15 using a Create Session Request message (S13). Then, the SGW 15 sends a Create Session Response message to the MME 25 as a response message to the Create Session Request message (S14). By receiving the Create Session Request message, the SGW 15 can identify the MME that manages the location of the UE 45. Further, by the transmission of the Create Session Response message, a session for the UE 45 is established between the MME 25 and the SGW 15.

Receiving the Create Session Response message, the MME 25 sends an Attach Accept message to the eNB 55 as a response signal to the Attach Request message (S15). By the transmission of the Attach Accept message, the MME 25 completes registration processing of the UE 45. The completion of registration processing of the UE 45 means the completion of movement processing of the UE 45. After that, the eNB 55 sends an Attach Accept message to the UE 45 (S16).

By receiving the Attach Accept message, the UE 45 becomes connected to the mobile communication system. The state where the UE 45 is connected to the mobile communication system may be referred to as the state where the UE 45 is attached to the mobile communication system.

Although the flow of processing when the power of the UE 45 is turned on is described above, the same processing is executed also when the location registration area where the UE 45 is located changes in order to generate location registration information in a new MME. When the location registration area where the UE 45 is located changes, the UE 45 sends a Tracking Area Update Request message instead of the Attach Request message. Further, the MME 25 and the SGW 15 send and receive Modify Bearer Request/Modify Bearer Response messages instead of the Create Session Request/Create Session Response messages.

Hereinafter, a flow of processing performed when an incoming packet call is made to the UE 45 while the UE 45 is during its movement which involves a change in the MME according to the second exemplary embodiment of the invention is described with reference to FIG. 7. In this example, it is assumed that the processing of FIG. 6 is completed, and the UE 45 is located in the location registration area managed by the MME 25.

First, when the UE 45 detects that it has moved from the location registration area managed by the MME 25 to another location registration area, the UE 45 sends a Tracking Area Update Request message to the eNB 65 that manages the location registration area to which it has moved (S21). The UE 45 may detect that the location registration area has changed by receiving annunciation information delivered from the eNB 65. Specifically, the UE 45 may detect that the location registration area has changed when the location registration area delivered from the eNB 55 before movement and the location registration area delivered from the eNB 65 after movement are different from each other.

Next, the eNB 65 sends a Tracking Area Update Request message for the UE 45 to the MME 35 that manages the location registration area including the communication area of its own device (S23). At the same time, S1 Connection is established between the eNB 65 and the MME 35 for communication of a control message between the UE 45 and the MME 35. It is assumed that the Tracking Area Update Request message contains the identifier of the MME 25 that used to manage the location registration area from which the UE 45 has moved.

Then, the MME 35 sends a Context Request message requesting the transfer of the location registration information to the MME 25 in order to acquire the location registration information of the UE 45 from the MME 25 (S24). By the transmission of the Context Request message requesting the transfer of the location registration information from the MME 35, the MME 25 can detect that the UE 45 has moved out of the location registration area managed by itself. Further, by receiving the Context Request message sent from the from the MME 35, the MME 25 can detect that the UE 45 has moved to the location registration area managed by the MME 35.

It is assumed that an incoming packet call to the UE45 is notified to the SGW 15 after the Context Request message is sent from the MME 35 to the MME 25 in Step S24 (S25). Incoming packet call is notified from the external network to the SGW 15 via the PGW 75.

Figure 6:
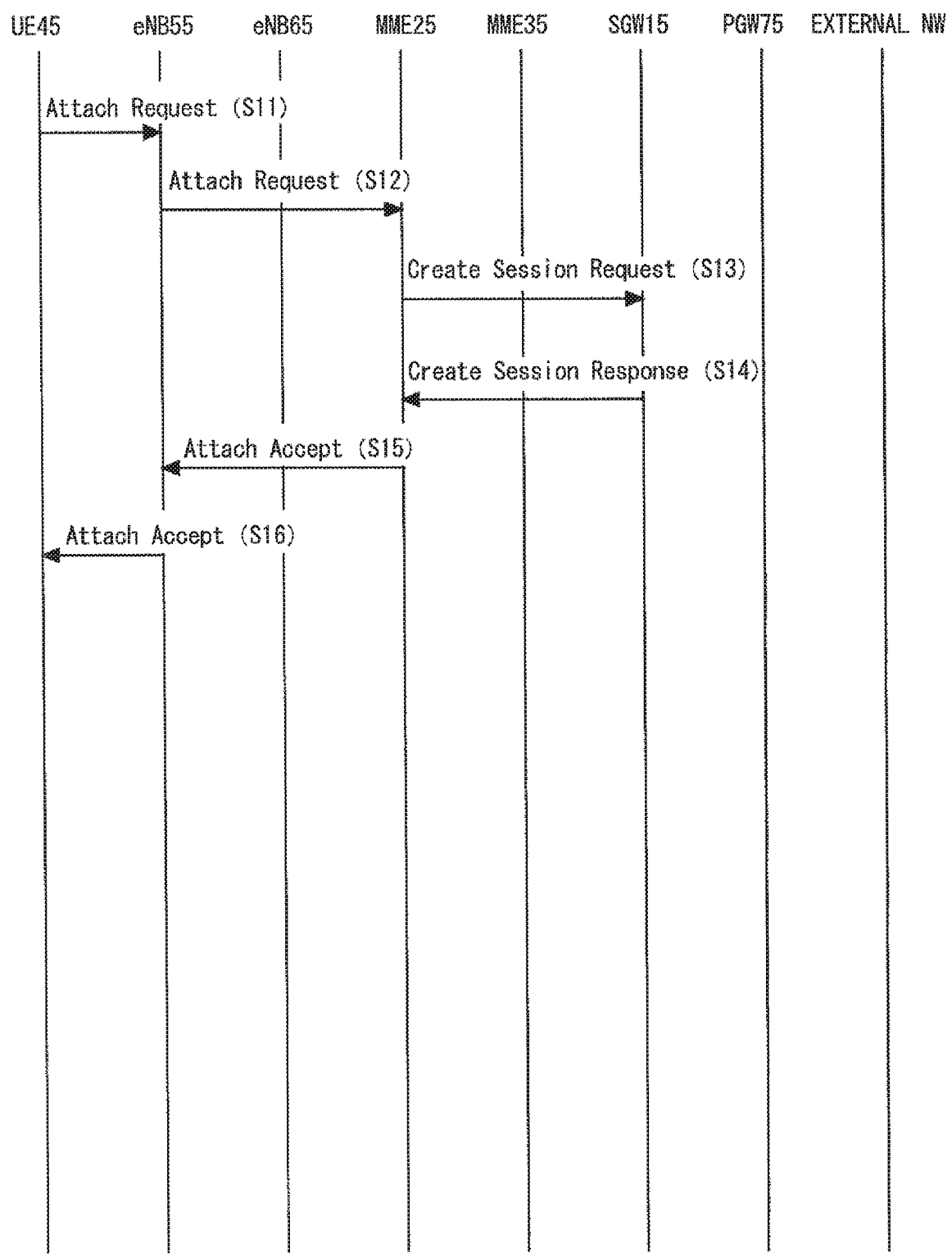
FIG. 6 is a diagram showing a flow of connection processing when connecting UE to a mobile communication system according to the second exemplary embodiment.

The SGW 15 has been notified in the connection processing in FIG. 6 that the UE 45 is located in the location registration area managed by the MME 25. Therefore, to notify an incoming packet call to the UE45, the SGW 15 sends a Downlink Data Notification message to the MME 25 in order to notify an incoming packet call to the UE45 (S26).

The MME 25 has detected that the UE 45 is during its movement by receiving the Context Request message in Step S24. Therefore, the MME 25 cannot temporarily perform call attempt to the UE 45, that is, temporarily rejects the Downlink Data Notification message. Then, the MME 25 sets Cause indicating that the UE 45 is during its movement and call attempt to the UE 45 is temporarily impossible and sends a Downlink Data Notification Acknowledge message in response to the Downlink Data Notification message (S27). To the Downlink Data Notification Acknowledge message, "Cause=Temporarily Rejected due to mobility" is set as Cause setting. "Cause=Temporarily Rejected due to mobility" indicates that information indicating that the UE is moving and call attempt is temporarily unavailable (temporarily rejected) is set to Cause.

Receiving the Downlink Data Notification Acknowledge message to which "Cause=Temporarily Rejected due to mobility" is set, the SGW 15 suspends incoming packet call processing, and starts a timer (locally configured guard timer) for retransmitting the Downlink Data Notification message, continuing buffering of the packet addressed to the UE 45.

Then, the MME 25 executes the operation as the MME that manages the location registration area from which the UE 45 moves in the Tracking Area Update Request message. Specifically, the MME 25 sends a Context Response message to the MME 35 as a response message to the Context Request message in Step S24 (S28). The MME that manages the location registration area from which the UE 45 moves may be referred to as Old MME. On the other hand, the MME that manages the location registration area to which the UE 45 moves may be referred to as New MME. The MME 25 notifies the location registration information of the UE 45 to the MME 35 using the Context Response message. The MME 35 sends a Context Acknowledge message to the MME 25 as a response message to the Context Response message (S29).

Then, the MME 35 sends a Modify Bearer Request message to the SGW 15 in order to notify switching of the session established between the MME 25 and the SGW 15 (S30). The session established between the MME 25 and the SGW 15 is the session that has been established in Steps S13 and S14 of FIG. 6. The SGW 15 detects that the movement processing of the UE 45 is completed in the MME 35 by receiving the Modify Bearer Request message. The MME 35 may send an identifier that identifies the session established between the MME 25 and the SGW 15 to the SGW 15 and thereby notify switching of the session established between the MME 25 and the SGW 15. The identifier that identifies the session established between the MME 25 and the SGW 15 may be contained in the Context Response message in Step S28.

The SGW 15 sends a Modify Bearer Response message to the MME 35 as a response message to the Modify Bearer Request message (S31). At the same time, the SGW 15 stops the timer (locally configured guard timer) that has been started when receiving the Downlink Data Notification Acknowledge message in Step S27.

Receiving the Modify Bearer Response message, the MME 35 sends a Tracking Area Update Accept message to the eNB 65 as a response message to Step S23 (S32). Then, the eNB 65 sends the sent Tracking Area Update Accept message to the UE 45 (S33).

After that, the MME 35 releases the S1 Connection that has been established between the MME 35 and the eNB 65 (S34).

Then, the SGW 15 sends a Downlink Data Notification message to the MME 35 that manages the location registration area to which the UE 45 moves in order to notify an incoming packet call to the UE45 (S35). Thus, in Step S35, the processing of sending the Downlink Data Notification message to the MME 25 in Step S26 is performed for the MME 35 that manages the location registration area to which the UE 45 moves. Then, the MME 35 sends a Paging message to the eNB 65 in order to perform call attempt to the UE 45 (S36), and the eNB 65 sends a Paging message to the UE located in the communication area under its control (S37). In this manner, after moving to the new location registration area, the UE 45 can receive a notification about the incoming packet call that has been made during its movement.

In the case where the timer (locally configured guard timer) that has been started when the Downlink Data Notification Acknowledge message is received in Step S27 expires before receiving the Modify Bearer Request message, the SGW 15 may end the incoming packet call processing to the UE45. Alternatively, the SGW 15 may send the Downlink Data Notification message to the MME 25 again to continue the incoming packet call processing.

In the case where the timer (locally configured guard timer) that has been started when the Downlink Data Notification Acknowledge message is received in Step S27 expires without receiving the Modify Bearer Request message, the SGW 15 may release the buffered packet addressed to the UE 45.

As described above, with use of the communication system according to the second exemplary embodiment of the invention, even when an incoming packet call is made to the UE 45 while the UE 45 is during its movement which involves a change in the MME and the movement processing of the UE 45 has not completed in the new MME, the UE 45 can normally receive an incoming packet call notification.

Further, in the case where the MME 35 is replaced with the SGSN 37 and the eNB 65 is replaced with the 2G/3G wireless control device 67 as shown in FIGS. 3 and 4, the Tracking Area Update Request message in Steps S21 and S23 is replaced with the Routing Area Update Request message. Further, the Tracking Area Update Accept message in Steps S32 and S33 is replaced with the Routing Area Update Accept message. If the MME 25 and the SGSN 37 activate ISR (Idle-mode signaling reduction), the continuation of the incoming packet call processing performed in Step S35 may be carried out by both of the MME 25 and the SGSN 37.

Third Exemplary Embodiment

Hereinafter, a flow of processing performed when an incoming packet call is made to the UE 45 while the UE 45 is during its movement which involves a change in the MME according to the third exemplary embodiment of the invention is described with reference to FIG. 8. Steps S41 to S49 are the same as Steps S21 to S29 in FIG. 7 and thus not redundantly described in detail. Further, when executing the processing of FIG. 8, it is assumed that the processing of FIG. 6 is completed, and the UE 45 is located in the location registration area managed by the MME 25.

After sending the Context Acknowledge message to the MME 25 in Step S49, the MME 35 sends a Modify Bearer Request message to the SGW 15 (S50). The SGW 15 sets information of "SGW requested active flag=ON" to the Modify Bearer Response message and sends it to the MME 35 (S51).

Receiving the information of "SGW requested active flag=ON", the MME 35 maintains the S1 Connection between the eNB 65 and the MME 35 that has been established for Attach processing or Tracking Area Update processing without releasing it. Further, the MME 35 also maintains the RRC (Radio Resource Control) connection between the UE 45 and the eNB 65 that has been established for Attach processing or Tracking Area Update processing. When the SGW 15 receives a Modify Bearer Request indicating the completion of movement of the UE after detecting that the UE to which an incoming packet call notified in Step S45 is made is during its movement, it sets information of "SGW requested active flag=ON" to the Modify Bearer Response message and sends it to the MME 35.

Receiving the Modify Bearer Response message, the MME 35 sends a Tracking Area Update Accept message to the eNB 65 as a response message to Step S43 (S52). The eNB 65 then sends the sent Tracking Area Update Accept message to the UE 45 (S53). Because the MME 35 has received the information of "SGW requested active flag=ON", it does not execute S1 Connection release processing. Further, at the same time as sending the Tracking Area Update Accept message, the MME 35 sends a wireless packet bearer establishment request message to the eNB 65 through the maintained S1 Connection. The wireless packet bearer is a bearer that is used for communication of user data such as audio data, image data or video data between the UE 45 and the eNB 65.

Receiving the wireless packet bearer establishment request message, the eNB 65 establishes a wireless packet bearer between the UE 45 and the eNB 65 using the RRC connection (S55). After establishing the wireless packet bearer, the eNB 65 sends a wireless packet bearer establishment response message to the MME 35 (S56). The wireless packet bearer establishment response message contains TEID (eNB Tunnel End Point Identifier) of the eNB 65.

Receiving the wireless packet bearer establishment response message, the MME 35 sends a Modify Bearer Request message to which the TEID of the eNB 65 is set to the SGW 15 (S57).

Then, the SGW 15 sends a Modify Bearer Response message to the MME 35 as response message to the Modify Bearer Request message (S58). The SGW 15 then sends the data addressed to the UE 45 to the TEID of the eNB 65 set to the Modify Bearer Request message. The eNB 65 sends the data addressed to the UE 45 sent from the SGW 15 to the UE 45 through the wireless packet bearer (S59).

As described above, in the flow of processing in FIG. 8, after the MME 35 sends the Tracking Area Update Accept message, it does not release S1 Connection and sends the wireless packet bearer establishment request message to the eNB 65 using the maintained S1 Connection. The UE 45 thereby remains connected with the mobile communication system, and the MME 35 can skip the processing of sending the Paging message and call attempt to the UE 45, which is described in FIG. 7.

Figure 7:
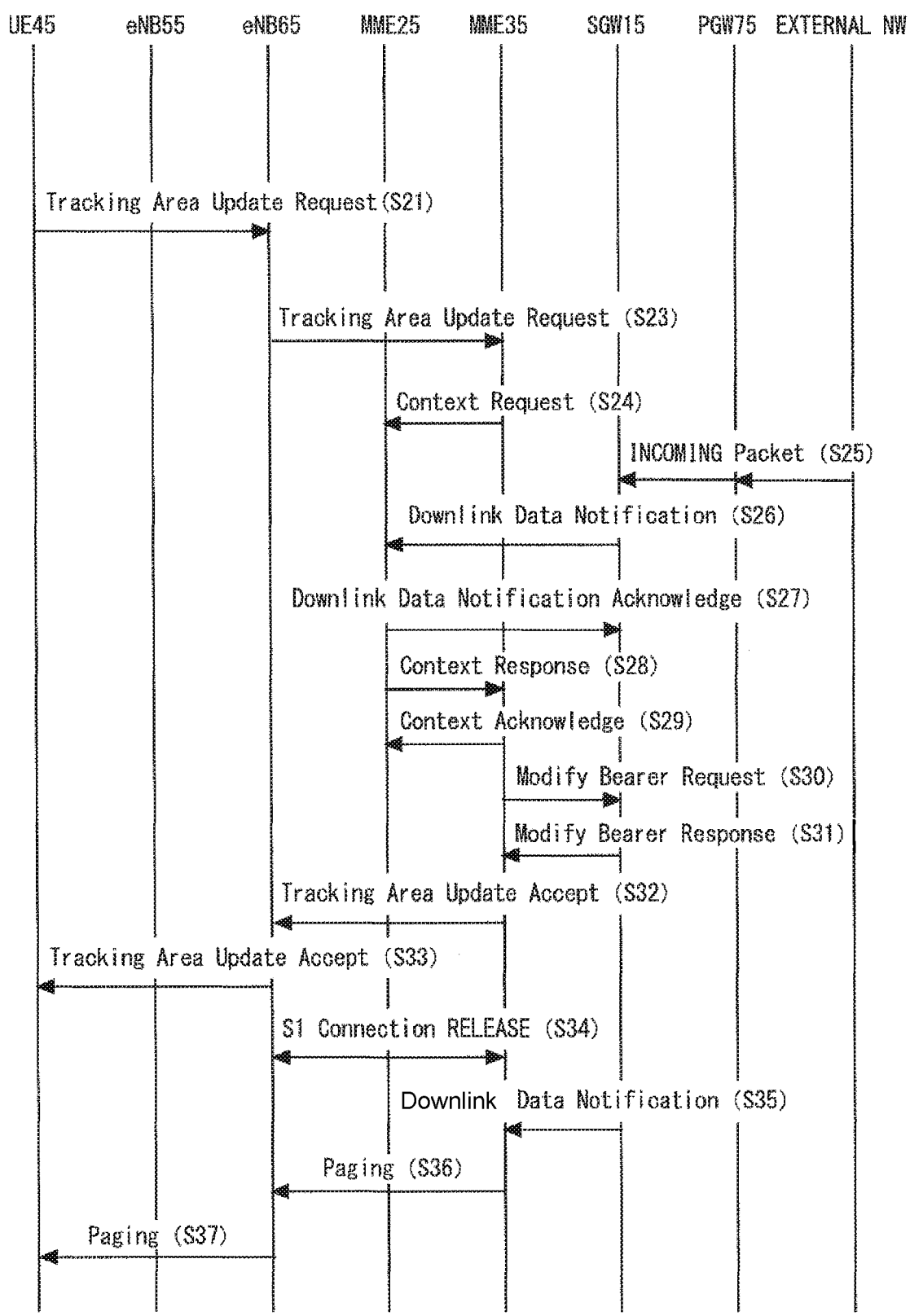
FIG. 7 is a diagram showing a flow of processing when an incoming packet call is made to UE according to the second exemplary embodiment.

In FIG. 7, the MME 35 releases S1 Connection with the eNB 65. The UE 45 thereby becomes disconnected from the mobile communication system, that is, becomes separated from the mobile communication system. Therefore, the MME 35 needs to send the Paging message to call the UE 45.

Figure 8:
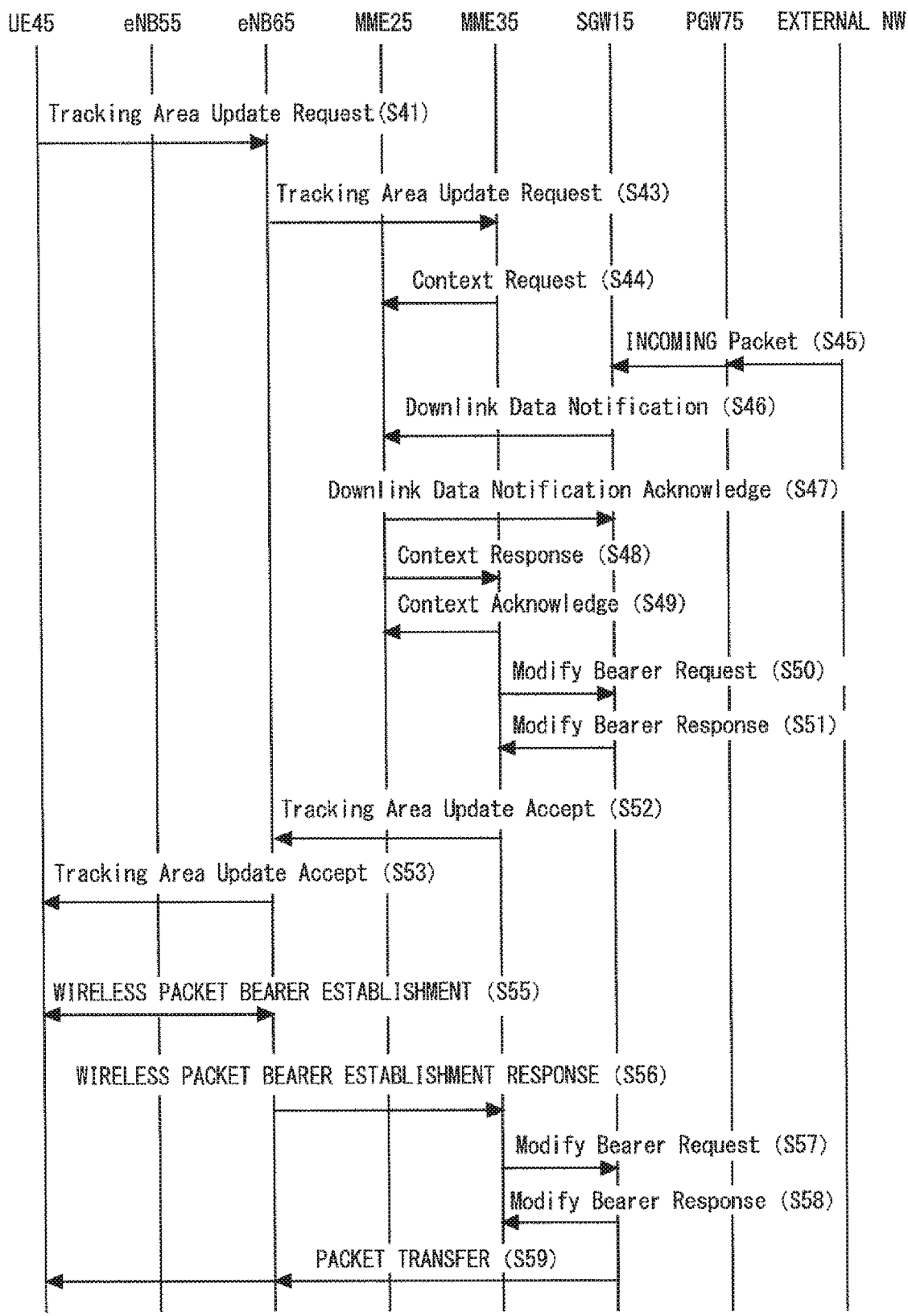
FIG. 8 is a diagram showing a flow of processing when an incoming packet call is made to UE according to a third exemplary embodiment.

On the other hand, in FIG. 8, the S1 Connection between the MME 35 and the eNB 65 is maintained, and further the RRC Connection between the UE 45 and the eNB 65 is maintained. Therefore, the MME 35 does not need to execute the processing of call attempt to the UE 45, and it is possible to skip the processing of sending the Paging message.

The MME 35 sends the Paging message to all the eNB located in the location registration area managed by itself. Further, the eNB that has received the Paging message sends the Paging message to all the UE located in the communication area under its control. Therefore, the processing of sending the Paging message is heavy-load processing in the mobile communication system. Thus, by omitting the transmission of the Paging message in FIG. 8, it is possible to reduce the load in the mobile communication system.

Fourth Exemplary Embodiment

Hereinafter, a flow of processing performed when an incoming packet call is made to the UE 45 while the UE 45 is during its movement which involves a change in the MME according to the fourth exemplary embodiment of the invention is described with reference to FIG. 9. Steps S61 to S67 are the same as Steps S21 to S27 in FIG. 7 and Steps S41 to S47 in FIG. 8 and thus not redundantly described in detail. Further, when executing the processing of FIG. 9, it is assumed that the processing of FIG. 6 is completed, and the UE 45 is located in the location registration area managed by the MME 25.

The MME 25 sends a Context Response message to the MME 35 as a response message to the Context Request message sent from the MME 35 in Step S64 (S68). The MME 25 sends the Context Response message to which "Active Flag=ON" is set to the MME 35 in order to notify that it is necessary to establish a wireless packet bearer. Then, the MME 35 sends a Context Acknowledge message to the MME 25 as a response message to the Context Response message (S69).

Steps S70 to S77 are the same as Steps S52 to S59 in FIG. 8 and thus not redundantly described in detail. In Steps S70 to S77, the processing of establishing a wireless packet bearer between the UE 45 and the eNB 65 is performed without releasing the S1 Connection, just like the processing of FIG. 8.

As described above, in the processing of FIG. 9, a message that serves as a trigger to establish a wireless packet bearer is sent to the MME 35 from the MME 25, not from the SGW 15. Therefore, in the processing of FIG. 9, it is possible to skip the transmission and reception of the Modify Bearer Request/Modify Bearer Response messages in Steps S50 and S51 in the processing of FIG. 8. Further, in the processing of FIG. 9, it is possible to skip the processing of sending the Paging message, just like the processing of FIG. 8.

Fifth Exemplary Embodiment

Figure 10:
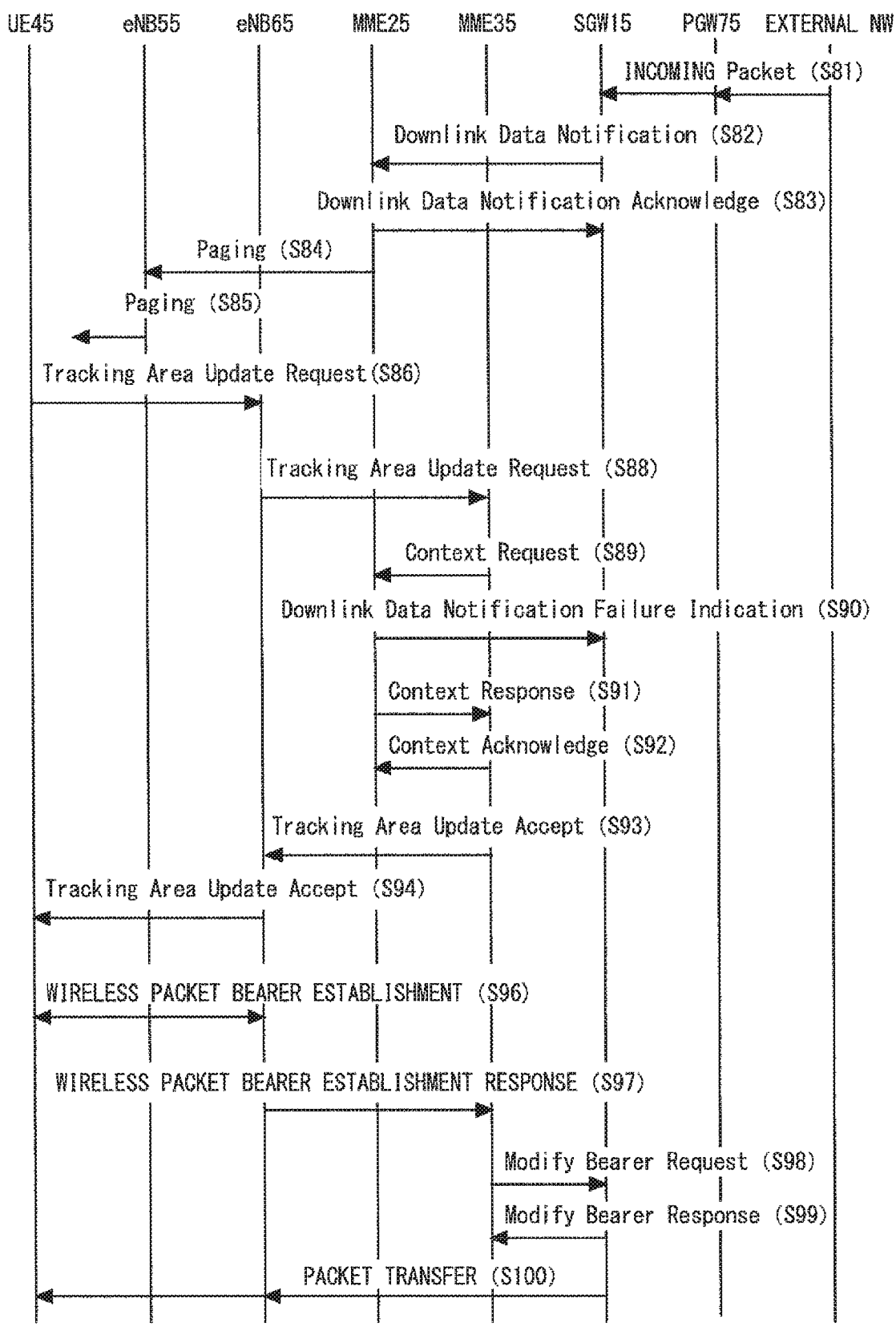
FIG. 10 is a diagram showing a flow of processing when an incoming packet call is made to UE according to a fifth exemplary embodiment.

Hereinafter, a flow of processing performed when the UE 45 makes its movement which involves a change in the MME after an incoming packet call is notified according to the fifth exemplary embodiment of the invention is described with reference to FIG. 10. When executing the processing of FIG. 10, it is assumed that the processing of FIG. 6 is completed, and the UE 45 is located in the location registration area managed by the MME 25.

First, the SGW 15 receives an incoming packet call to the UE45 (S81). The SGW 15 receives an incoming packet call that is sent from the external network through the PGW 75. The SGW 15 has been notified in the connection processing in FIG. 6 that the UE 45 is located in the location registration area managed by the MME 25. Therefore, to notify an incoming packet call to the UE45, the SGW 15 sends a Downlink Data Notification message to the MME 25 (S82).

Next, the MME 25 sends a Downlink Data Notification Acknowledge message as a response message to the Downlink Data Notification message (S83). The MME 25 then sends a Paging message to the eNB 55 for call attempt to the UE 45 (S84), and the eNB 55 sends the Paging message to the UE located in the communication area under its control (S85).

It is assumed that, immediately before the eNB 55 sends the Paging message or immediately after the eNB 55 sends the Paging message in Step S85, the UE 45 moves out of the wireless communication area managed by the eNB 55 and out of the location registration area managed by the MME 25. In such a case, the UE 45 cannot receive the Paging message.

When the UE 45 moves out of the location registration area managed by the MME 25 and into the location registration area managed by the MME 35, the UE 45 sends a Tracking Area Update Request message to the eNB 65 located in the location registration area managed by the MME 35 (S86).

Then, the eNB 65 sends a Tracking Area Update Request message for the UE 45 to the MME 35 that manages the location registration area including the communication area of its own device (S88). At the same time, S1 Connection is established between the eNB 65 and the MME 35 for communication of a control message. It is assumed that the Tracking Area Update Request message contains the identifier of the MME 25 that used to manage the location registration area from which the UE 45 has moved.

Then, the MME 35 sends a Context Request message requesting the transfer of the location registration information to the MME 25 in order to acquire the location registration information of the UE 45 from the MME 25 (S89). By the transmission of the Context Request message requesting the transfer of the location registration information of the UE 45 from the MME 35, the MME 25 can detect that the UE 45 has moved out of the location registration area managed by itself. Further, by receiving the Context Request message sent from the from the MME 35, the MME 25 can detect that the UE 45 has moved to the location registration area managed by the MME 35.

The MME 25 has detected that the UE 45 is during its movement by receiving the Context Request message in Step S89. Therefore, the MME 25 stops call attempt to the UE 45 and temporarily rejects the Downlink Data Notification. Then, the MME 25 sets Cause indicating that the UE 45 is during its movement and call attempt to the UE 45 is temporarily impossible (temporarily rejected) and sends a Downlink Data Notification Failure Indication message indicating a failure in incoming packet call notification (S90). To the Downlink Data Notification Acknowledge message, "Cause=Temporarily Rejected due to mobility" is set as Cause setting.

Receiving the Downlink Data Notification Failure Indication message to which "Cause=Temporarily Rejected due to mobility" is set, the SGW 15 suspends incoming packet call processing, and starts a timer (locally configured guard timer) for retransmitting the Downlink Data Notification message, continuing buffering of the packet addressed to the UE 45.

The MME 25 notifies the location registration information of the UE 45 to the MME 35 using the Context Response message as a response message to the Context Request message (S91). The MME 25 sends the Context Response message to which "Active Flag=ON" is set to the MME 35 in order to notify that call attempt to the UE 45 has been performed. Then, the MME 35 sends a Context Acknowledge message to the MME 25 as a response message to the Context Response message (S92).

Figure 9:
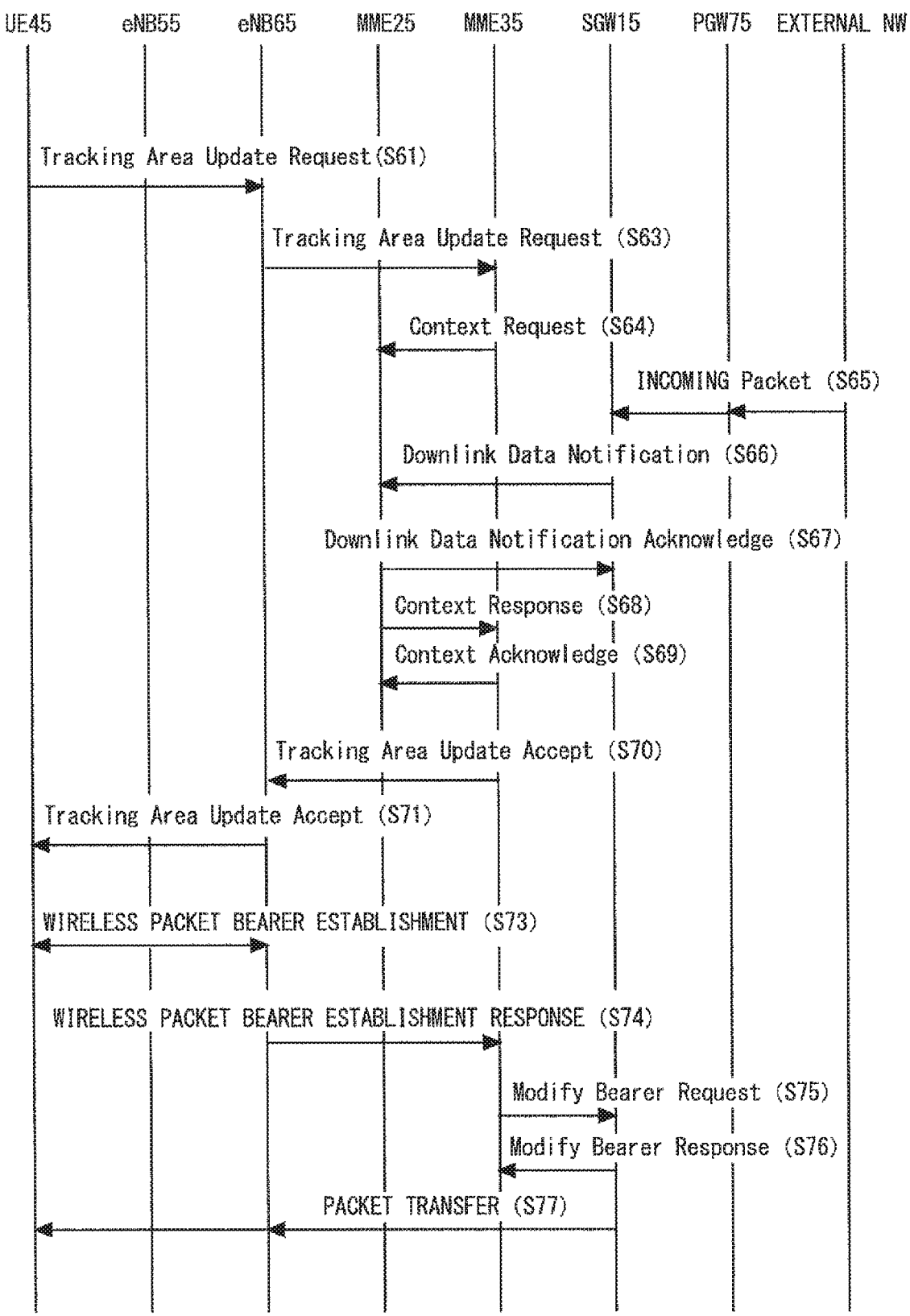
FIG. 9 is a diagram showing a flow of processing when an incoming packet call is made to UE according to a fourth exemplary embodiment.

Steps S93 to S100 are the same as Steps S70 to S77 in FIG. 9 and thus not redundantly described in detail.

As described above, in the processing of FIG. 10, even in the case where the Paging message cannot be notified to the UE 45 because the UE 45 has started its movement which involves a change in the MME, it is possible to notify the movement of the UE 45 from the MME 35 that manages the location registration area to which the UE 45 moves to the MME 25 that manages the location registration area from which the UE 45 moves. Further, the MME 25 can notify the MME 35 that the processing of notifying the Paging message to the UE 45 has been executed. The MME 35 can thereby detect that an incoming packet call is made to the UE45. Thus, the MME 35 instructs establishment of a wireless bearer between the UE 45 and the eNB 65, and thereby the SGW 15 can transmit data addressed to the UE 45 to the UE 45.

Although the present invention is described as a hardware configuration in the above exemplary embodiments, the present invention is not limited thereto. The present invention may be implemented by causing a CPU (Central Processing Unit) to execute a computer program to perform the processing of the bearer management device and the mobility management device.

The above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not restricted to the above-described exemplary embodiment, and various changes and modifications may be made without departing from the scope of the invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-105981, filed on May 20, 2013, and Japanese patent application No. 2013-191772, filed on Sep. 17, 2013, the disclosure of which is incorporated herein in its entirety by this reference.

REFERENCE SIGNS LIST

10 BEARER MANAGEMENT DEVICE
11 INCOMING CALL CONTROL UNIT
15 SGW
16 INCOMING CALL CONTROL UNIT
17 DATA ACCUMULATION UNIT
20 MOBILITY MANAGEMENT DEVICE
21 LOCATION REGISTRATION AREA
25 MME
30 MOBILITY MANAGEMENT DEVICE
31 LOCATION REGISTRATION AREA
35 MME
40 MOBILE TERMINAL DEVICE
45 UE
55 eNB
65 eNB
75 PGW

What is claimed is:

1. A communication method for a first network node for session management, the method comprising:
   receiving a notification from a second network node;
   sending a first message to a first mobility management node;
   starting a locally configured guard timer when the first network node receives, from the first mobility management node, a response message, the response message indicating that the first message is temporarily rejected; and
   resending the first message to a second mobility management node if the first network node receives a message from the second mobility management node.

* * * * *